United States Patent
Peng et al.

(10) Patent No.: US 12,443,882 B2
(45) Date of Patent: Oct. 14, 2025

(54) MACHINE LEARNING ALGORITHM SEARCH WITH SYMBOLIC PROGRAMMING

(71) Applicant: Google LLC, Mountain View, CA (US)

(72) Inventors: Daiyi Peng, Cupertino, CA (US); Yifeng Lu, Cupertino, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 644 days.

(21) Appl. No.: 17/905,196

(22) PCT Filed: Jun. 4, 2021

(86) PCT No.: PCT/US2021/036002
§ 371 (c)(1),
(2) Date: Aug. 29, 2022

(87) PCT Pub. No.: WO2021/248068
PCT Pub. Date: Dec. 9, 2021

(65) Prior Publication Data
US 2023/0144138 A1 May 11, 2023

Related U.S. Application Data

(60) Provisional application No. 63/035,551, filed on Jun. 5, 2020.

(51) Int. Cl.
*G06N 20/00* (2019.01)
*G06N 5/01* (2023.01)

(52) U.S. Cl.
CPC ............ *G06N 20/00* (2019.01); *G06N 5/01* (2023.01)

(58) Field of Classification Search
None
See application file for complete search history.

(56) References Cited

U.S. PATENT DOCUMENTS 11,354,594 B2 * 6/2022 Chen ................... G06F 17/18
11,429,895 B2 * 8/2022 Yakovlev ............. G06N 5/01
(Continued)

OTHER PUBLICATIONS

Koehrsen, "Automated Machine Learning Hyperparameter Tuning in Python," Jul. 3, 2018, https://medium.com/data-science/automated-machine-learning-hyperparameter-tuning-in-python-dfda59b72f8a.*

(Continued)

*Primary Examiner* — Ryan Barrett
(74) *Attorney, Agent, or Firm* — Fish & Richardson P.C.

(57) ABSTRACT

A method for searching for an output machine learning (ML) algorithm to perform an ML task is described. The method comprising: receiving data specifying an input ML algorithm; receiving data specifying a search algorithm that searches for candidate ML algorithms and an evaluation function that evaluates the performance of candidate ML algorithms; generating data representing a symbolic tree from the input ML algorithm; generating data representing a hyper symbolic tree from the symbolic tree; searching an algorithm search space that defines a set of possible concrete symbolic trees from the hyper symbolic tree for candidate ML algorithms and training the candidate ML algorithms to determine a respective performance metric for each candidate ML algorithm; and selecting one or more trained candidate ML algorithms among the trained candidate ML algorithms based on the determined performance metrics.

18 Claims, 4 Drawing Sheets

(56) References Cited

U.S. PATENT DOCUMENTS

| | | | | |
|---|---|---|---|---|
| 11,544,136 | B1* | 1/2023 | Pekel | G06N 20/00 |
| 11,900,222 | B1* | 2/2024 | Alakuijala | G06N 20/20 |
| 2019/0129764 | A1* | 5/2019 | Johnson | G06N 7/01 |
| 2019/0156229 | A1* | 5/2019 | Tee | G06N 20/00 |
| 2020/0019888 | A1* | 1/2020 | McCourt | G06N 20/00 |
| 2020/0042832 | A1* | 2/2020 | Kim | G06F 18/217 |
| 2020/0065705 | A1* | 2/2020 | Cheng | G06N 20/20 |
| 2020/0285939 | A1* | 9/2020 | Baker | G06F 18/24 |
| 2020/0387565 | A1* | 12/2020 | Caglar | G06N 3/082 |
| 2021/0264199 | A1* | 8/2021 | Walters | G06F 18/2185 |
| 2021/0326736 | A1* | 10/2021 | Kishimoto | G06F 18/217 |
| 2022/0012601 | A1* | 1/2022 | Amad-Ud-Din | G06N 5/01 |
| 2022/0035878 | A1* | 2/2022 | Sarah | G06F 16/953 |
| 2022/0036123 | A1* | 2/2022 | Cummings | G06N 20/00 |
| 2022/0036246 | A1* | 2/2022 | Chen | G06N 5/022 |
| 2022/0092471 | A1* | 3/2022 | Jaeger | G06N 20/20 |
| 2022/0108125 | A1* | 4/2022 | Dai | G06N 7/01 |
| 2022/0180209 | A1* | 6/2022 | Xu | G06N 3/08 |
| 2022/0366318 | A1* | 11/2022 | Wu | G06N 3/045 |
| 2023/0068816 | A1* | 3/2023 | Cmielowski | G06N 20/10 |
| 2023/0196101 | A1* | 6/2023 | Ghanta | G06N 5/04 706/12 |
| 2023/0237787 | A1* | 7/2023 | Olaleye | G06N 3/082 382/157 |
| 2023/0289276 | A1* | 9/2023 | Kozhaya | G06F 11/3447 |
| 2023/0289277 | A1* | 9/2023 | Sathe | G06F 11/3452 |
| 2023/0401451 | A1* | 12/2023 | Chen | G06F 40/51 |
| 2024/0330753 | A1* | 10/2024 | Chen | G06F 8/35 |
| 2025/0147471 | A1* | 5/2025 | Nakane | F24F 11/63 |

OTHER PUBLICATIONS

Wu et al., "Hyperparameter Optimization for Machine Learning Models Based on Bayesian Optimization," Journal of Electronic Science and Technology vol. 17, Issue 1, Mar. 2019, pp. 26-40, https://doi.org/10.11989/JEST.1674-862X.80904120, https://www.sciencedirect.com/science/article/pii/S1674862X19300047.*

Li, "Massively Parallel Hyperparameter Optimization," Dec. 12, 2018, https://blog.ml.cmu.edu/2018/12/12/massively-parallel-hyperparameter-optimization/.*

Abadi et al., "Tensorflow: A system for large-scale machine learning" In The {USENIX} Symposium on Operating Systems Design and Implementation ({OSDI} 16), Nov. 2016, 265-283.

Akiba et al., "Optuna: A next-generation hyperparameter optimization framework" CoRR, Submitted on Jul. 2019, arXiv:1907.10902v1, 10 pages.

Andre et al., "State abstraction in programmable reinforcement learning" In AAAI Conference on Artificial Intelligence (AAAI), 2002, 119-125.

Balog et al., "DeepCoder: Learning to write programs" CoRR, Submitted on Mar. 2017, arXiv:1611.01989v2, 21 pages.

Bender et al., "Can weight sharing outperform random architecture search? an investigation with TuNAS" In The IEEE Conference on Computer Vision and Pattern Recognition, 2020, 14323-14332.

Bergstra et al., "Random search for hyper-parameter optimization" The Journal of Machine Learning Research 13, (JMLR), Feb. 2012, 281-305.

Bergstra et al., "Theano: a cpu and gpu math compiler in Python" In Proceedings of the Python for scientific computing conference (SciPy), 2010, 7 pages.

Bratman et al., "Strong mitigation: Nesting search for good policies within search for good reward" In Proceedings of the 11th International Conference on Autonomous Agents and Multiagent Systems—vol. 1, Jun. 2012, 8 pages.

Buchberger, "Symbolic computation (an editorial)" J. Symbolic Comput, 1(1), Jan. 1985, 6 pages.

Cai et al., "ProxylessNAS: Direct neural architecture search on target task and hardware" CoRR, Submitted on Feb. 2019, 13 pages.

Canziani et al., "An analysis of deep neural network models for practical applications" CoRR, Submitted on Apr. 2017, arXiv:1605.07678v4, 7 pages.

Chainer.org [online], "A powerful, flexible and intuitive framework of neural networks" Aug. 2003, retrieved on Dec. 5, 2023, retrieved from URL <https://chainer.org/>, 3 pages.

Colmerauer et al., "The birth of prolog" In History of programming languages—II, 1996, 331-367.

Dai et al, "Chamnet: Towards efficient network design through platform-aware model adaptation" In Proceedings of the IEEE Conference on Computer Vision and Pattern Recognition, 2019, 11398-11407.

Devlin et al., "Robustfill: Neural program learning under noisy i/o" In The International Conference on Machine Learning (ICML), 2017, 9 pages.

Dong et al., "AutoHAS: Efficient hyperparameter and architecture search" CoRR, Submitted on Apr. 2021, arXiv:2006.03656v3, 12 pages.

Dong et al., "NATS-Bench: Benchmarking nas algorithms for architecture topology and size" CoRR, Submitted on Jan. 2021, arXiv:2009.00437v6, 14 pages.

Erickson et al., "Autogluon-tabular: Robust and accurate automl for structured data" CoRR, Submitted on Mar. 2020, arXiv:2003.06505v1, 28 pages.

Feurer et al., "Chapter 6 : Auto-sklearn: efficient and robust automated machine learning" In Automated Machine Learning, May 2019, 113-134.

Frostig et al., "Compiling machine learning programs via high-level tracing" In Conference on Machine Learning and Systems (MLSys), 2018, 3 pages.

Ghaisi et al., "NAS-FPN: learning scalable feature pyramid architecture for object detection" CoRR, Submitted on Apr. 2019, arXiv:1904.07392v1, 10 pages.

Github.com [online], "Gin-config" Apr. 2019, retrieved on Dec. 5, 2023, retrieved from URL <https://github.com/google/gin-config>, 10 pages.

Github.com [online], "Keras tuner" Jun. 2019, retrieved on Dec. 5, 2023, retrieved from URL <https://github.com/keras-team/keras-tuner>, 4 pages.

Github.com [online], "Neural network intelligence" Oct. 2018, retrieved on Dec. 5, 2023, retrieved from URL <https://github.com/microsoft/nni>, 6 pages.

Golovin et al., "Google vizier: A service for black-box optimization" In The SIGKDD International Conference on Knowledge Discovery and Data Mining, Aug. 2017, 1487-1495.

Gulwani et al., "Program synthesis" Foundations and Trends R in Programming Languages, 4(1-2), 2017, 134 pages.

Gulwani et al., "Synthesis of loop-free programs." ACM SIGPLAN Notices 46.6, Jun. 2011, 12 pages.

He et al., "Deep residual learning for image recognition" In Proceedings of the IEEE Conference on Computer Vision and Pattern Recognition (CVPR), 2016, 770-778.

International Preliminary Report on Patentability in International Appln. No. PCT/US2021/036002, mailed on Dec. 15, 2022, 10 pages.

International Search Report and Written Opinion in International Appln. No. PCT/US2021/036002, mailed on Oct. 1, 2021, 16 pages.

Jaderberg et al., "Population based training of neural networks" CoRR, Submitted on Nov. 2017, arXiv:1711.09846v2, 21 pages.

Jia et al., "Caffe: Convolutional architecture for fast feature embedding" CoRR, Submitted on Jun. 2014, arXiv:1408.5093v1, 4 pages.

Jin et al., "Auto-keras: An efficient neural architecture search system" In The SIGKDD International Conference on Knowledge Discovery and Data Mining, Aug. 2019, 1946-1956.

Kotthoff et al., "Auto-weka 2.0: Automatic model selection and hyperparameter optimization in weka" The Journal of Machine Learning Research (JMLR), 18(1), 2017, 5 pages.

Krizhevsky et al., "Imagenet classification with deep convolutional neural networks" In The Conference on Neural Information Processing Systems (NeurIPS), 2012, 9 pages.

Liang et al., "Memory augmented policy optimization for program synthesis and semantic parsing" In The Conference on Neural Information Processing Systems (NeurIPS), 2018, 13 pages.

Liu et al., "Darts: Differentiable architecture search" CoRR, Submitted on Apr. 2019, arXiv:1806.09055v2, 13 pages.

(56) References Cited

OTHER PUBLICATIONS

McCarthy, "Recursive functions of symbolic expressions and their computation by machine, part I" Communications of the ACM, 1960, 3(4):184-195.
Melis et al., "On the state of the art of evaluation in neural language models" CoRR, Submitted on Nov. 2017, arXiv:1707.05589v2, 10 pages.
Neelakantan et al., "Neural programmer: Inducing latent programs with gradient descent" CoRR, Submitted on Aug. 2016, arXiv:1511.04834v3, 18 pages.
Negrinho et al., "Towards modular and programmable architecture search" In The Conference on Neural Information Processing Systems (NeurIPS), 2019, 11 pages.
Olson et al., "TPOT: A Tree-Based Pipeline Optimization Tool for Automating Machine Learning : Methods, Systems, Challenges" In Workshop on automatic machine learning, PMLR, Dec. 2016, 66-74.
Parisotto et al., "Neuro-symbolic program synthesis" CoRR, Submitted on Nov. 2016, arXiv:1611.01855v1, 14 pages.
Paszke et al., "PyTorch: An imperative style, high-performance deep learning library" In The Conference on Neural Information Processing Systems (NeurIPS), 2019, 10 pages.
Pham et al., "Efficient neural architecture search via parameter sharing" In The International Conference on Machine Learning (ICML), Jul. 2018, 10 pages.
Polozov et al., "Flashmeta: A framework for inductive program synthesis." Proceedings of the 2015 ACM SIGPLAN International Conference on Object-Oriented Programming, Systems, Languages, and Applications, Oct. 2015, 20 pages.
Real et al., "Automl-zero: Evolving machine learning algorithms from scratch" CoRR, Submitted on Jun. 2020, arXiv:2003.03384v2, 23 pages.
Real et al., "Large-scale evolution of image classifiers" In Proceedings of the 34th International Conference on Machine Learning—vol. 70, Jul. 2017, 10 pages.
Real et al., "Regularized evolution for image classifier architecture search" In AAAI Conference on Artificial Intelligence (AAAI), 2019, 4780-4789.
Reference.wolfram.com [online], "Version 12.1" 2020, retrieved on Dec. 5, 2023, retrieved from URL <https://reference.wolfram.com/legacy/system-modeler/v12.1/>, 2 pages.
Sandler et al., "Mobilenetv2: Inverted residuals and linear bottlenecks" In Proceedings of the IEEE conference on computer vision and pattern recognition, 2018, 4510-4520.
Schulman et al., "Proximal policy optimization algorithms" CoRR, Submitted on Aug. 2017, arXiv:1707.06347v2, 12 pages.
Shen et al., "Lingvo: a modular and scalable framework for sequence-to sequence modeling" CoRR, Submitted on Feb. 2019, arXiv:1902.08295v1, 17 pages.
Snoek et al., "Practical bayesian optimization of machine learning algorithms" In The Conference on Neural Information Processing Systems (NeurIPS), 2012, 9 pages.
Solar-Lezama, "The sketching approach to program synthesis" In Asian Symposium on Programming Languages and Systems, 2009, 10 pages.
Søndergaard et al., "Non-determinism in functional languages" The Computer Journal,35(5), Oct. 1992, 514-523.
Sussman, "Building robust systems an essay" In Massachusetts Institute of Technology, Jan. 2007, 28 pages.
Tan et al., "EfficientNet: Rethinking model scaling for convolutional neural networks" In The International Conference on Machine Learning (ICML), 2019, 10 pages.
Tan et al., "MNASNet: Platform-aware neural architecture search for mobile" In Proceedings of the IEEE Conference on Computer Vision and Pattern Recognition (CVPR), 2019, 2820-2828.
Tsakonas, "Local and global optimization for Takagi-Sugeno fuzzy system by memetic genetic programming," Expert Systems with Applications, Jun. 15, 2013, 40(8):3282-3298.
Valkov et al., "Houdini: Lifelong learning as program synthesis" In The Conference on Neural Information Processing Systems (NeurIPS), 2018, 12 pages.
Wen et al., "Neural predictor for neural architecture search" CoRR, Submitted on Dec. 2019, arXiv:1912.00848v1, 13 pages.
Wikipedia.org [online], "Lego" created on Oct. 2001, retrieved on Dec. 6, 2023, retrieved from URL <https://en.wikipedia.org/wiki/Lego>.
Wikipedia.org [online], "Symbolic programming" created on Nov. 2010, retrieved on Dec. 5, 2023, retrieved from URL <https://en.wikipedia.org/wiki/Symbolic_programming>, 1 page.
Williams, "Simple statistical gradient-following algorithms for connectionist reinforcement learning" Machine learning, 8(3-4), 1992, 229-256.
Wu et al., "Fbnet: Hardware-aware efficient convnet design via differentiable neural architecture search" In Proceedings of the IEEE Conference on Computer Vision and Pattern Recognition, 2019, 10734-10742.
Xie et al., "Snas: Stochastic neural architecture search" CoRR, Submitted on Apr. 2020, arXiv:1812.09926v3, 17 pages.
Ying et al., "Nas-bench 101: Towards reproducible neural architecture search" In The International Conference on Machine Learning (ICML), May 2019, 10 pages.
Zela et al., "Towards automated deep learning: Efficient joint neural architecture and hyperparameter search" CoRR, Submitted on Jul. 2018, arXiv:1807.06906v1, 11 pages.
Zoph et al., "Learning transferable architectures for scalable image recognition" In Proceedings of the IEEE Conference on Computer Vision and Pattern Recognition (CVPR), 2018, 8697-8710.
Zoph et al., "Neural architecture search with reinforcement learning" CoRR, Submitted on Feb. 2017, arXiv:1611.01578v2, 16 pages.

\* cited by examiner

```
Trainer(
    model=ResNetLike(
        block=Sequential([
            Conv(4, (3, 3)),
            BatchNormalization(),
            ReLU(),
        ]),
        num_blocks=12),
    optimizer=Adam(2e-4) )
```

Input ML algorithm

FIG. 2A

```
Trainer(
  ├model=ResNetLike(
  │  ├block=Sequential([
  │  │  ├Conv(4, (3, 3)),
  │  │  ├BatchNormalization(),
  │  │  └ReLU(),
  │  │  ]),
  │  └num_blocks=12),
  └optimizer=Adam(2e-4)]
```

Symbolic Tree

FIG. 2B

```
Trainer(
  ├model=ResNetLike(
  │  ├block=Sequential([
  │  │  permutate([
  │  │  ├Conv(
  │  │  │  ├filters=oneof([4, 8]),
  │  │  │  └kernel=(3, 3)),
  │  │  ├BatchNormalization(),
  │  │  └ReLU(),
  │  │  ])),
  │  └num_blocks=intv(6, 12)),
  └optimizer=oneof([
       Adam(2e-4),
       RMSProp(floatv(1e-6, 1e-3))]
    )),
```

Hyper Symbolic Tree

FIG. 2C

MACHINE LEARNING ALGORITHM SEARCH WITH SYMBOLIC PROGRAMMING

CROSS REFERENCE TO RELATED APPLICATIONS

This application is a national stage of International Application No. PCT/US2021/036002, filed Jun. 4, 2021, which is a non-provisional of and claims priority to U.S. Provisional Patent Application No. 63/035,551, filed on Jun. 5, 2020, the entire contents of which are hereby incorporated by reference.

BACKGROUND

This specification relates to determining a machine learning algorithm to perform a machine learning task.

The machine learning algorithm can be, for example, a neural network. Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that determines an output machine learning algorithm to perform a particular machine learning task.

The subject matter described in this specification can be implemented in particular embodiments so as to realize one or more of the following advantages. By treating searching through a search space, i.e., neural architecture search, as a control flow primitive to manipulate the symbols in the tree of symbols that defines the search space, the described system can effectively identify high performing machine learning algorithms for any of a variety of machine learning tasks. In particular, by using symbolic programming to formulate key elements of machine learning algorithm under a symbolic paradigm, the described techniques allow all parts of a target machine learning algorithm (or target program) to be generally searchable and make the search space become straightforward, expressive and easy to modify. Thus, search algorithms can be reused and switched with almost zero cost, enabling them to collaborate with each other in a complex search flow in a computationally efficient manner. In addition, the search process can be greatly simplified into a for-loop with a feedback operations, allowing basic control flow patterns to express an arbitrary complex search flow. Thus, by using the described approach, complex search flows can be readily deployed to identify high performing algorithms, new search spaces can be studied easily and new search algorithms can be introduced with less cost. As a result, the techniques described herein can effectively scale Automated Machine Learning (AutoML) in both depth and breadth based on a diverse profile of projects, the proportion of shared code, and the development cost in bootstrapping a new search as well as introducing complex search methods and algorithms.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A shows an example of an input machine learning algorithm.

FIG. 2B shows an example symbolic tree.

FIG. 2C shows an example of a hyper symbolic tree.

Like reference numbers and designations in the various drawings indicate like elements.

DETAILED DESCRIPTION

Figure 1:
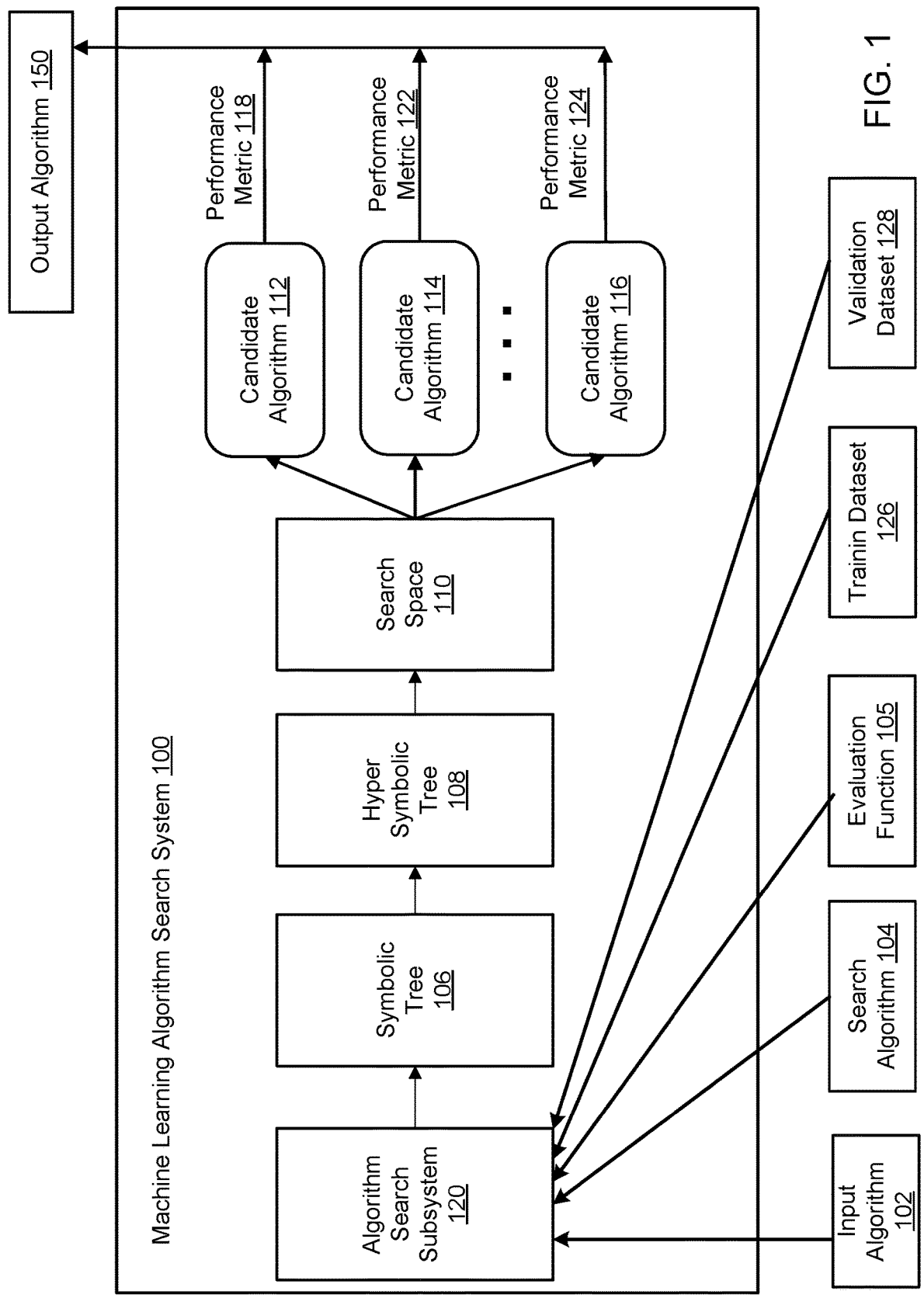
FIG. 1 shows an example machine learning algorithm search system.

This specification describes a system implemented as computer programs on one or more computers in one or more locations that determines an output machine learning algorithm to perform a particular machine learning task.

The machine learning algorithm defines one or more of: a model architecture for a machine learning model (a neural network) for performing the task, hyperparameters for the training of the model to perform the task, or preprocessing techniques (e.g., data augmentation policies) applied to inputs during, after, or both the training.

The machine learning model can be configured to perform any kind of machine learning tasks, i.e., can be configured to receive any kind of digital data input and to generate any kind of score, classification, or regression output based on the input.

In some cases, the machine learning model is a neural network that is configured to perform an image processing task, i.e., receive an input image and to process intensity values or color values of pixels in the input image to generate a network output for the input image. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient. Such electronic health record data may comprise physiological data relating to a patient, such as blood glucose, blood pressure, body temperature, heart-rate or the like. Examples of adverse health events comprise hypo- and/or hyper-glycemic events, heart attacks, strokes or the like.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent. Examples of observations or other data characterizing states of an environment comprise sensor data related to the agent, such as visual data, LIDAR readings, sonar readings, or the like. The output defines an action to be performed by the agent may comprise control signals for controlling the agent to perform the action, or data that may be converted to such signals.

FIG. 1 shows an example machine learning algorithm search system 100. The system 100 is an example of a system implemented as computer programs on one or more computers in one or more locations, in which the systems, components, and techniques described below can be implemented.

To determine an output machine learning algorithm (e.g., output machine learning algorithm 150) to perform a particular machine learning task, the system 100 includes an algorithm search subsystem 120 that is configured to receive (i) data specifying an input machine learning algorithm 102 that performs the particular machine learning task, (ii) data specifying a search algorithm 104 that searches for candidate machine learning algorithms, and (iii) data specifying an evaluation function 105 that evaluates the performance of candidate machine learning algorithms.

The search algorithm 104 employs a search strategy to search for a candidate machine learning algorithm from a search space. The search strategy can be one of (i) brute force search strategy, (ii) random search strategy, (iii) evolution search strategy, (iv) multi stage search strategy, (v) nested search strategy, (vi) hybrid search strategy, (vii) weight-sharing search strategy, (viii) Reinforcement Learning (RL)-based methods, (ix) gradient-based methods, or (x) neural predictors. For example, the search algorithm 104 can be Random Search, Bayesian optimization, a reinforcement learning-based search that learns a controller policy that guides the search using Proximal Policy Optimization (PPO), Regularized Evolution, or efficient Neural Architecture Search (TuNAS).

The subsystem 120 further receives a training dataset 126 and a validation dataset 128 for training a neural network defined by a candidate machine learning algorithm (hereafter referred to as a "candidate ML algorithm"). The training dataset 126 includes a set of training examples. Each training example in the set of training examples includes an example input for the particular machine learning task and a corresponding example output for the particular machine learning task. The validation dataset 128 includes a set of validation examples. Each validation example in the set of validation examples includes a validation input for the particular machine learning task and a corresponding validation output for the particular machine learning task. For example, a larger set of training data may have been randomly partitioned to generate the training dataset and the validation dataset.

The subsystem 120 can receive data specifying the input ML algorithm 102, data specifying a search algorithm 104, data specifying an evaluation function 105, the training dataset 126 and the validation dataset 128 in any of a variety of ways. For example, the system 100 can receive data specifying the input ML algorithm 102, data specifying a search algorithm 104, data specifying an evaluation function 105, the training dataset 126 and the validation dataset 128 from another computing system over a data communication network, e.g., using an application programming interface (API) made available by the system 100. As another example, the system 100 can allow the user to specify, using a user interface provided by the system 100, which data that is already maintained by the system 100 should be used as the data specifying the input ML algorithm 102, data specifying a search algorithm 104, data specifying an evaluation function 105, the training dataset 126 and the validation dataset 128.

FIG. 2A shows an example of an input ML algorithm. The input ML algorithm 202 is for training a machine learning model (e.g., ResNetLike) using an optimizer (e.g., the Adam optimizer). The input ML algorithm 202 specifies a structure of the machine learning model that includes a plurality of blocks with each block including a sequence of Conv(4, (3, 3)), BatchNormalization( ), and ReLU( ) and the number of blocks is 12.

The subsystem 120 generates data representing a symbolic tree 106 from the input machine learning algorithm 102. The symbolic tree is a tree of nodes, in which each node represents a component in the input machine learning algorithm and is associated with a concrete value.

FIG. 2B shows an example of a symbolic tree generated from the input ML algorithm. The symbolic tree 204 is a tree of nodes generated from the input ML algorithm 202. The symbolic tree 204 has node 203 that represents the machine learning model (the respective concrete value in this example is ResNetLike), node 205 that represents the architecture of a block in the machine learning model (the respective concrete value in this example is Sequential(Conv (4, (3, 3), BatchNormalization( ) ReLU( ))), node 214 that represents a number of blocks in the machine learning model (the respective concrete value in this example is 12), and node 216 represents an optimizer (the respective concrete value in this example is Adam(2e-4)) that is used to train the machine learning model.

Referring to FIG. 1, the subsystem 120 generates data representing a hyper symbolic tree 108 from the symbolic tree 106 by changing each node in a subset of the plurality of the nodes in the symbolic tree 106 to a respective new node having a respective placeholder value. The respective new node is associated with a corresponding set of possible concrete values that the respective placeholder value can take.

The placeholder value of a node is a hyper value. There are multiple classes of hyper values: 1) a continuous value (e.g., a value declared by floatv); 2) a discrete value (e.g., a value declared by intv); and 3) a categorical value (a value declared by oneof, manyof or permutate). Table 1 summarizes different hyper value classes with their semantics.

TABLE 1

Hyper value classes and their semantics

| Strategy | Hyper-parameter annotation | Search space semantics |
|---|---|---|
| Continuous | floatv(min, max) | A float value from $\mathbb{R}^{[min, max]}$ |
| Discrete | intv(min, max) | An int value from $\mathbb{Z}^{[min, max]}$ |
| Categorical | oneof(candidates) | Choose 1 out of N candidates |
| | manyof(K, candidates, θ) | Choose K out of N candidates with optional constraints θ on the uniqueness and order of chosen candidates |
| | permutate(candidates) | A special case of manyof which searches for a permutation of all candidates |
| Hierarchical | (when a categorical hyper value contains child hyper values) | Conditional search space |

FIG. 2C shows an example of a hyper symbolic tree generated from a symbolic tree. The system generates the hyper symbolic tree 206 from the symbolic tree 204 by changing node 205 to a new node 208 that has a placeholder value with a set of possible concrete values. The set of possible concrete values for node 208 includes a set of possible block architectures defined by a permutation of a sequence of neural network layers (in this example [Conv, BatchNormalization, ReLU]) in which the Conv layer has a searchable filter size (in this example one of([4,8])). Node 214 in the symbolic tree 204 is changed to a new node 210 where the number of blocks can be chosen from a set of possible concrete values of (in this example 6 or 12). Node 216 in the symbolic tree 204 is changed to a new node 212 in which the fixed Adam optimizer in node 216 is swapped with a choice between the Adam optimizer and an RMSProp optimizer with a searchable learning rate in the real number range of $10^{-6}$ to $10^{-3}$ (i.e., learning rate ∈ floatv(1e-6, 1e-3)) in node 212.

Referring to FIG. 1, the subsystem 120 searches an algorithm search space 110 that defines a set of possible concrete symbolic trees from the hyper symbolic tree 108. Each node in a possible concrete symbolic tree corresponds to a respective node in the hyper symbolic tree and takes a particular concrete value from a corresponding set of possible concrete values associated with the respective node in the hyper symbolic tree. Each possible concrete symbolic tree corresponds to a candidate machine learning algorithm.

The subsystem 120 searches the algorithm search space 110 for a candidate ML algorithm by performing the following operations. The subsystem 120 generates data representing a candidate concrete symbolic tree by using the search algorithm 104 to search for the candidate concrete symbolic tree in the algorithm search space 110. In particular, the subsystem 120 generates an abstract search space from the search space 110 and uses the search algorithm to sample an abstract candidate algorithm from the abstract search space. The subsystem 120 generates a candidate concrete symbolic tree using the abstract candidate algorithm 306. The subsystem 120 then generates a candidate machine learning algorithm 112 from the candidate concrete symbolic tree.

An example process for searching the algorithm search space 110 for a candidate ML algorithm using the search algorithm 104 is described in more detail below with respect to FIG. 3

The subsystem 120 trains the candidate machine learning algorithm 112 on the particular machine learning task using the received training dataset 126 and validation dataset 128. The subsystem 120 determines, using the evaluation function 105, a performance metric 118 specifying a performance of the trained candidate machine learning algorithm 112 on the particular machine learning task.

The performance metric can be, for example, a validation loss, a training loss, a weighted combination of the validation loss and the training loss, or any metric that is appropriate for the particular machine learning task.

In some implementations, the subsystem 120 may evaluate a performance of a trained candidate machine learning algorithm by executing the evaluation function 105 on the trained candidate ML algorithm on validation examples of a single validation dataset (e.g., the validation dataset 104).

In some other implementations, the subsystem 120 may evaluate a performance of a trained candidate machine learning algorithm by executing the evaluation function 105 on the trained candidate ML algorithm on validation examples of multiple validation datasets. This would allow for better generalization of the output machine learning algorithm 150 to new datasets (or new machine learning tasks).

The subsystem 120 can repeat the above operations multiple times to generate other candidate ML algorithm(s) and their corresponding performance metric(s), e.g., candidate ML algorithm 114 and its performance metric 122, and candidate ML algorithm 116 and its performance metric 124.

After each candidate ML algorithm or a batch of multiple candidates is generated and evaluated, the performance metric of the candidate ML algorithm or the batch is fed back to the search algorithm to improve future sampling of abstract candidate algorithms from the abstract search space.

To determine the output ML algorithm 150, the subsystem 120 selects one or more trained candidate machine learning algorithms among the trained candidate machine learning algorithms based on the determined performance metrics. In some implementations, the subsystem 120 may select K trained candidate machine learning algorithms with best performance metrics among the trained candidate machine learning algorithms. The subsystem 120 may further train or further fine tune the K trained candidate machine learning algorithms and then select the best trained candidate machine learning algorithm as the output machine learning algorithm 150 for the machine learning task. In some other implementations, the subsystem 120 may select one trained candidate machine learning algorithm having the highest performance metric among the trained candidate machine learning algorithms as the output machine learning algorithm 150 for the machine learning task.

In some implementations, the system 100 may process, using the output machine learning algorithm 150, a machine learning input to generate a machine learning output to perform the particular machine learning task. Alternatively or additionally, the system 100 can provide the output machine learning algorithm 150 to another system that uses the output machine learning algorithm to process a new input to generate a new output.

Figure 3:
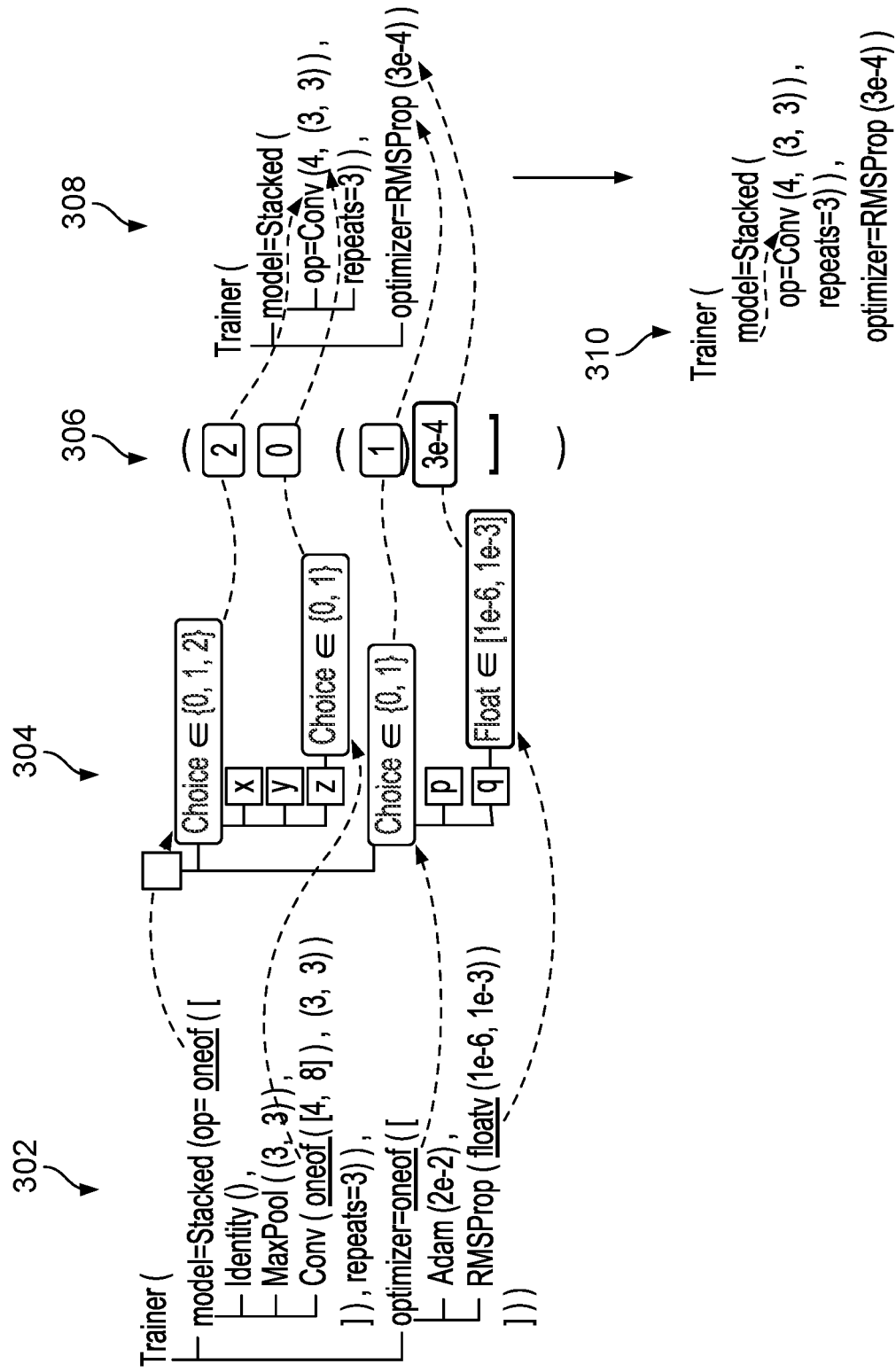
FIG. 3 illustrates an example process for search a search space for a candidate ML algorithm.

FIG. 3 illustrates an example process for generating, using a search algorithm (e.g., the search algorithm 104 of FIG. 1), a candidate ML algorithm from a search space. For convenience, the process 300 will be described as being performed by a system of one or more computers located in one or more locations. For example, a machine learning algorithm search system, e.g., the machine learning algorithm search system 100 of FIG. 1, appropriately programmed in accordance with this specification, can perform the process 300.

The system generates an abstract search space 304 from a search space defined by a hyper symbolic tree 302 to prevent the search algorithm from seeing the full search space specification. With the abstract search space 304, the search algorithm can only see what it needs to see for the purposes of searching. The abstract search space 304 is the algorithm's view of the search space 302. The full specification, in contrast, can be referred to the concrete search space (or just the "search space"). The distinction between the concrete and abstract search space is: the concrete search space acts as a boilerplate for producing a candidate concrete symbolic tree (that defines a corresponding candidate ML algorithm), which holds all the algorithm details (e.g., the fixed parts). However, the abstract search space only sees the parts that need decisions, along with their possible concrete values (e.g., numeric ranges). Based on the abstract search space 304, the system generates an abstract candidate algorithm 306 by using the search algorithm. In particular, the search algorithm samples the abstract candidate algorithm 306 from the abstract search space 304 based on performance metrics generated for previous candidate machine learning algorithms. The abstract candidate algorithm 306 can include, for each of the placeholder value in the hyper symbolic tree 302, a respective concrete value (i.e., a number choice) that the placeholder value takes.

The system recursively merges the placeholder values (i.e., hyper values) from the hyper symbolic tree 302 and the numeric choices from the abstract candidate algorithm 306 to generate a candidate concrete symbolic tree 308. For a continuous or discrete hyper value, the value of choice is the final value to be assigned to its target node in the tree 302, while for a categorical hyper value, the value of choice is the index of the selected candidate. For example, as shown in FIG. 3, number 2 in the abstract algorithm 306 specifies the index of Conv layer (among three layers Identity( ), MaxPool, and Conv) in the hyper symbolic tree 302, number 0 specifies the first choice (i.e., 4) in the two choices (i.e., [4,8]) for filters of the Conv layer, number 1 specifies the second choice (i.e., the RMSProp optimizer) in the two choices of optimizer (i.e., Adam and RMSProp), and 3e-4 specifies the learning rate of the RMSProp optimizer. Given data in the candidate concrete symbolic tree 308, the system them generates the candidate ML algorithm 310.

Figure 4:
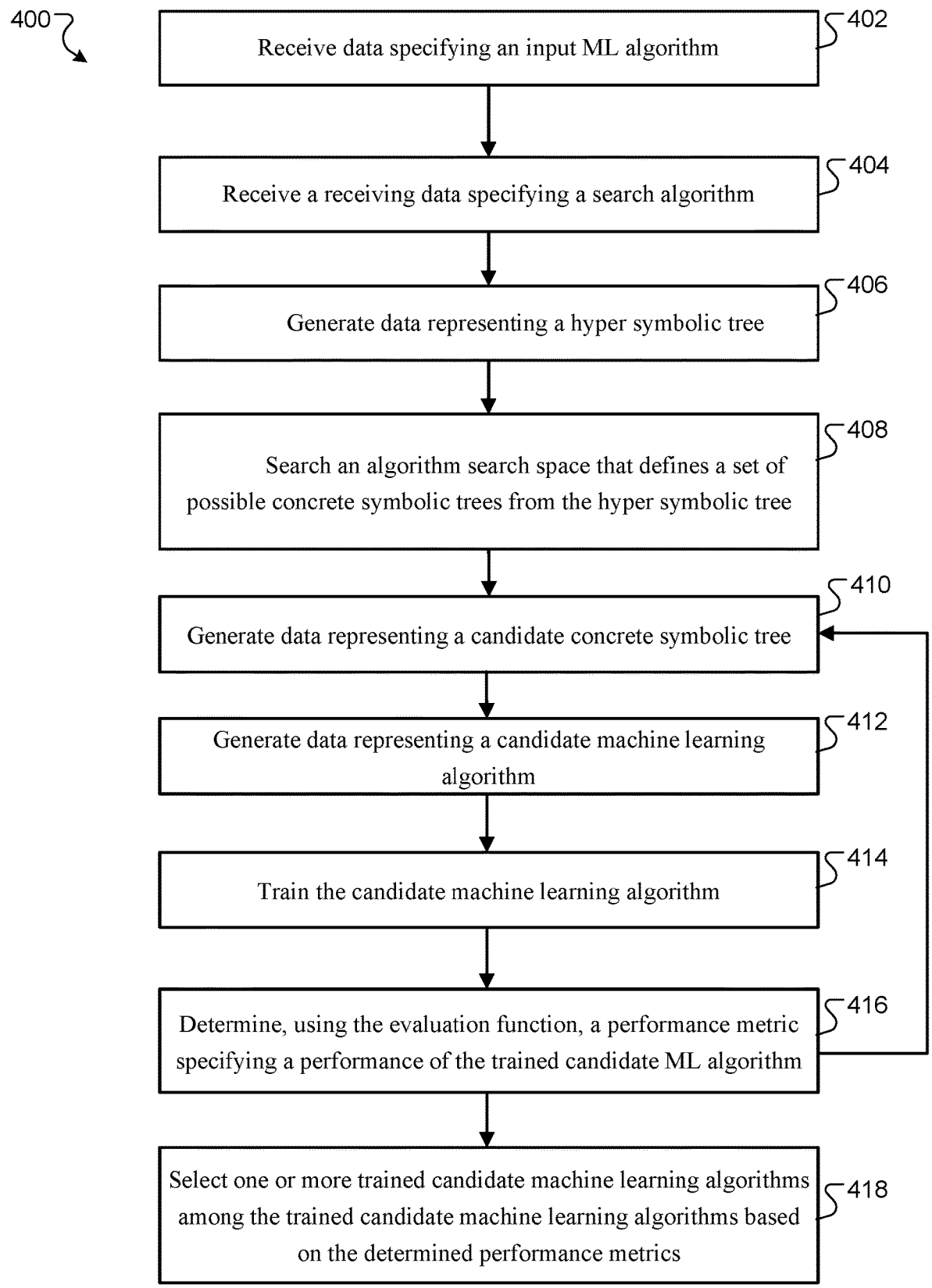
FIG. 4 is a flow diagram of an example process for searching for an output machine learning algorithm to perform a machine learning task.

FIG. 4 is a flow diagram of an example process for searching for an output machine learning algorithm to perform a machine learning task. For convenience, the process 400 will be described as being performed by a system of one or more computers located in one or more locations. For example, a machine learning algorithm search system, e.g., the machine learning algorithm search system 100 of FIG. 1, appropriately programmed in accordance with this specification, can perform the process 400.

The system receives data specifying an input machine learning algorithm that performs the particular machine learning task (step 402). The particular machine learning task can be one of the following tasks: a classification task, a regression task, or an image recognition task.

The system receives data specifying a search algorithm that searches for candidate machine learning algorithms and an evaluation function that evaluates the performance of candidate machine learning algorithms (step 404).

The search algorithm employs a search strategy to search for a candidate machine learning algorithm from a search space. The search strategy can be one of (i) brute force search strategy, (ii) random search strategy, (iii) evolution search strategy, (iv) multi stage search strategy, (v) nested search strategy, (vi) hybrid search strategy, (vii) weight-sharing search strategy, (viii) Reinforcement Learning (RL)-based methods, (ix) gradient-based methods, or (x) neural predictors. For example, the search algorithm 104 can be Random Search, Bayesian optimization, a reinforcement learning-based search that learns a controller policy that guides the search using Proximal Policy Optimization (PPO), Regularized Evolution, or efficient Neural Architecture Search (TuNAS). In some implementations, the search algorithm includes a plurality of search operations that are executed in a distributed manner.

The system further receives a training dataset and a validation dataset for training candidate machine learning algorithms on the particular machine learning task.

The system generates data representing a symbolic tree from the input machine learning algorithm (step 406). The symbolic tree is a tree of a plurality of nodes, in which each node represents a component in the input machine learning algorithm and is associated with a concrete value. In some implementations, a node in the symbolic tree can be associated with a symbolic operation. The symbolic operation associated with the at least one node in the symbolic tree is one of (i) a transform operation that transforms the node, (ii) an infer operation that provides information on the property of the node, (iii) a query operation that provides information on the neighboring nodes of the node, or (iv) a replicate operation that provides a copy of the node. The symbolic operation may be applied to the component of the input machine learning algorithm represented by the node.

The system generates data representing a hyper symbolic tree from the symbolic tree by changing each node in a subset of the plurality of the nodes in the symbolic tree to a respective new node having a respective placeholder value with a corresponding set of possible concrete values (step 408). A placeholder value of a node is a hyper value. The hyper value is one of a continuous value, a discrete value, or a categorical value.

The system searches an algorithm search space that defines a set of possible concrete symbolic trees from the hyper symbolic tree by performing steps 410-416 at least once. Each node in a possible concrete symbolic tree corresponds to a respective node in the hyper symbolic tree and takes a particular concrete value from a corresponding set of possible concrete values associated with the respective node in the hyper symbolic tree. Each possible concrete symbolic tree corresponds to a candidate machine learning algorithm.

The system generates data representing a candidate concrete symbolic tree by using the search algorithm to search for the candidate concrete symbolic tree in the algorithm search space (step 410).

In particular, the system generates an abstract search space from the search space. The abstract search space is a tree of decision nodes with each decision node being mapped to a respective placeholder value in the hyper symbolic tree.

The system uses the search algorithm to sample an abstract candidate algorithm from the abstract search space. In particular, the search algorithm samples the abstract candidate algorithm from the abstract search space based on performance metrics generated for previous candidate machine learning algorithms. The abstract candidate algorithm can include, for each of the placeholder value in the hyper symbolic tree, a respective concrete value (i.e., a number choice) that the placeholder value takes.

The system recursively merges the placeholder values (i.e., hyper values) from the hyper symbolic tree and the numeric choices from the abstract candidate algorithm to generate the candidate concrete symbolic tree. For example, below is a simplified example of an abstract search space:

```
search_space = oneof([
  oneof(['a', 'b', 'c']),
  'x',
  'y',
])
```

The above abstract search space is a depth-2 tree (i.e., the tree has two levels of depth). The first child node has a subtree of 3 nodes ('a', 'b', 'c'), while the other two child nodes of the root are leaves ('x', 'y'). The decisions to reach 'b' can be described by an abstract candidate algorithm [0, 1], which means selecting the first node at level 1, and then the second node at level 2. Since the depth of the tree is determined by the search space, the process to generate the candidate concrete symbolic tree is performed recursively.

The system generates a candidate machine learning algorithm from the candidate concrete symbolic tree (step 412).

The system trains the candidate machine learning algorithm on the particular machine learning task using the received training dataset (step 414).

The system determines, using the evaluation function, a performance metric specifying a performance of the trained candidate machine learning algorithm on the particular machine learning task (step 416).

The performance metric can be, for example, a validation loss, a training loss, a weighted combination of the validation loss and the training loss, or any metric that is appropriate for the particular machine learning task.

In some implementations, the system may evaluate a performance of a trained candidate machine learning algorithm by executing the evaluation function on the trained candidate ML algorithm on validation examples of a single validation dataset (e.g., the received validation dataset).

In some other implementations, the system may evaluate a performance of a trained candidate machine learning algorithm by executing the evaluation function on the trained candidate ML algorithm on validation examples of multiple validation datasets. This would allow for better generalization of the output machine learning algorithm to new datasets (or new machine learning tasks).

The system selects one or more trained candidate machine learning algorithms among the trained candidate machine learning algorithms based on the determined performance metrics (step 418).

In some implementations, the system may select K trained candidate machine learning algorithms with best performance metrics among the trained candidate machine learning algorithms. The system may further train or further fine tune the K trained candidate machine learning algorithms and then select the best trained candidate machine learning algorithm as the output machine learning algorithm for the machine learning task. In some other implementations, the system may select one trained candidate machine learning algorithm having the highest performance metric among the trained candidate machine learning algorithms as the output machine learning algorithm for the machine learning task.

In some implementations, the system may process, using the output machine learning algorithm, a machine learning input to generate a machine learning output to perform the particular machine learning task. For example, the output machine learning algorithm can be configured to process digital data input to generate a score, a classification, or a regression output based on the digital data input to perform the machine learning task. Alternatively or additionally, the system can provide the output machine learning algorithm to another system that uses the output machine learning algorithm to process a new input to generate a new output.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for searching for an output machine learning algorithm to perform a particular machine learning task given an input machine learning algorithm, the method comprising:
   receiving data specifying an input machine learning algorithm that performs the particular machine learning task;
   receiving data specifying a search algorithm that searches for candidate machine learning algorithms and an evaluation function that evaluates the performance of candidate machine learning algorithms;
   generating data representing a symbolic tree from the input machine learning algorithm, wherein the symbolic tree is a tree of a plurality of nodes, wherein each node represents a component in the input machine learning algorithm and is associated with a concrete value;
   generating data representing a hyper symbolic tree from the symbolic tree by changing each node in a subset of the plurality of the nodes in the symbolic tree to a respective new node having a respective placeholder value with a corresponding set of possible concrete values;
   searching an algorithm search space that defines a set of possible concrete symbolic trees from the hyper symbolic tree, wherein each node in a possible concrete symbolic tree corresponds to a respective node in the hyper symbolic tree and takes a particular concrete value from a corresponding set of possible concrete values associated with the respective node in the hyper symbolic tree, wherein each possible concrete symbolic tree corresponds to a candidate machine learning algorithm, and wherein searching the algorithm search space comprises performing the following operations at least once:
      generating data representing a candidate concrete symbolic tree by using the search algorithm to search for the candidate concrete symbolic tree in the algorithm search space;
      generating a candidate machine learning algorithm from the candidate concrete symbolic tree,
      training the candidate machine learning algorithm on the particular machine learning task,
      determining, using the evaluation function, a performance metric specifying a performance of the trained candidate machine learning algorithm on the particular machine learning task; and
   selecting one or more trained candidate machine learning algorithms among the trained candidate machine learning algorithms based on the determined performance metrics.

2. The method of claim 1, wherein the particular machine learning task is one of the following tasks: a classification task, a regression task, or an image recognition task.

3. The method of claim 1, wherein a placeholder value of a node is a hyper value.

4. The method of claim 3, wherein the hyper value is one of a continuous value, a discrete value, or a categorical value.

5. The method of claim 1, wherein at least one node in the symbolic tree is associated with a symbolic operation.

6. The method of claim 5, wherein the symbolic operation associated with the at least one node in the symbolic tree is one of (i) a transform operation that transforms the node, (ii) an infer operation that provides information on the property of the node, (iii) a query operation that provides information on the neighboring nodes of the node, or (iv) a replicate operation that provides a copy of the node, and wherein the method comprises applying the symbolic operation to the component of the input machine learning algorithm represented by the at least one node.

7. The method of claim 1, further comprising generating an abstract search space from the algorithm search space, wherein the abstract search space is a tree of decision nodes with each decision node being mapped to a respective placeholder value in the hyper symbolic tree.

8. The method of claim 7, wherein generating the data representing the candidate concrete symbolic tree by using the search algorithm to search in the algorithm search space further comprises:
generating the data representing the candidate concrete symbolic tree by applying the search algorithm on the abstract search space using previous performance metrics of previous candidate machine learning algorithms.

9. The method of claim 8, wherein the search algorithm uses a search strategy to generate the data representing candidate concrete symbolic tree.

10. The method of claim 9, wherein the search strategy is one of (i) brute force search strategy, (ii) random search strategy, (iii) evolution search strategy, (iv) multi stage search strategy, (v) nested search strategy, (vi) hybrid search strategy, (vii) weight-sharing search strategy, (viii) Reinforcement Learning (RL)-based methods, (ix) gradient-based methods, or (x) neural predictors.

11. The method of claim 1, wherein the search algorithm comprises a plurality of search operations that are executed in a distributed manner.

12. The method of claim 1, wherein the output machine learning algorithm is configured to process digital data input to generate a score, a classification, or a regression output based on the digital data input to perform the machine learning task.

13. The method of claim 1, wherein selecting the one or more trained candidate machine learning algorithms comprises selecting a plurality of trained candidate machine learning algorithms with best performance metrics among the trained candidate machine learning algorithms.

14. The method of claim 13, further comprising:
further training the plurality of trained candidate machine learning algorithms on the particular machine learning task, and
selecting the best candidate machine learning algorithm among the furthered trained candidate machine learning algorithms as the output machine learning algorithm for the machine learning task.

15. The method of claim 1, wherein selecting the one or more trained candidate machine learning algorithms comprises: selecting a trained candidate machine learning algorithm with the highest performance metric among the trained candidate machine learning algorithms as the output machine learning algorithm for the machine learning task.

16. A system comprising one or more computers and one or more storage devices storing instructions that when executed by the one or more computers cause the one or more computers to perform operations for searching for an output machine learning algorithm to perform a particular machine learning task given an input machine learning algorithm, the operations comprising:
receiving data specifying an input machine learning algorithm that performs the particular machine learning task;
receiving data specifying a search algorithm that searches for candidate machine learning algorithms and an evaluation function that evaluates the performance of candidate machine learning algorithms;
generating data representing a symbolic tree from the input machine learning algorithm, wherein the symbolic tree is a tree of a plurality of nodes, wherein each node represents a component in the input machine learning algorithm and is associated with a concrete value;
generating data representing a hyper symbolic tree from the symbolic tree by changing each node in a subset of the plurality of the nodes in the symbolic tree to a respective new node having a respective placeholder value with a corresponding set of possible concrete values;
searching an algorithm search space that defines a set of possible concrete symbolic trees from the hyper symbolic tree, wherein each node in a possible concrete symbolic tree corresponds to a respective node in the hyper symbolic tree and takes a particular concrete value from a corresponding set of possible concrete values associated with the respective node in the hyper symbolic tree, wherein each possible concrete symbolic tree corresponds to a candidate machine learning algorithm, and wherein searching the algorithm search space comprises performing the following operations at least once:
generating data representing a candidate concrete symbolic tree by using the search algorithm to search for the candidate concrete symbolic tree in the algorithm search space;
generating a candidate machine learning algorithm from the candidate concrete symbolic tree,
training the candidate machine learning algorithm on the particular machine learning task,
determining, using the evaluation function, a performance metric specifying a performance of the trained candidate machine learning algorithm on the particular machine learning task; and
selecting one or more trained candidate machine learning algorithms among the trained candidate machine learning algorithms based on the determined performance metrics.

17. One or more computer storage media storing instructions that when executed by one or more computers cause the one or more computers to perform operations for searching for an output machine learning algorithm to perform a particular machine learning task given an input machine learning algorithm, the operations comprising:
receiving data specifying an input machine learning algorithm that performs the particular machine learning task;
receiving data specifying a search algorithm that searches for candidate machine learning algorithms and an evaluation function that evaluates the performance of candidate machine learning algorithms;
generating data representing a symbolic tree from the input machine learning algorithm, wherein the symbolic tree is a tree of a plurality of nodes, wherein each node represents a component in the input machine learning algorithm and is associated with a concrete value;
generating data representing a hyper symbolic tree from the symbolic tree by changing each node in a subset of the plurality of the nodes in the symbolic tree to a respective new node having a respective placeholder value with a corresponding set of possible concrete values;
searching an algorithm search space that defines a set of possible concrete symbolic trees from the hyper symbolic tree, wherein each node in a possible concrete symbolic tree corresponds to a respective node in the hyper symbolic tree and takes a particular concrete value from a corresponding set of possible concrete values associated with the respective node in the hyper symbolic tree, wherein each possible concrete symbolic tree corresponds to a candidate machine learning algorithm, and wherein searching the algorithm search space comprises performing the following operations at least once:
- generating data representing a candidate concrete symbolic tree by using the search algorithm to search for the candidate concrete symbolic tree in the algorithm search space;
- generating a candidate machine learning algorithm from the candidate concrete symbolic tree,
- training the candidate machine learning algorithm on the particular machine learning task,
- determining, using the evaluation function, a performance metric specifying a performance of the trained candidate machine learning algorithm on the particular machine learning task; and selecting one or more trained candidate machine learning algorithms among the trained candidate machine learning algorithms based on the determined performance metrics.

18. A method comprising:

providing data specifying an input machine learning algorithm to an algorithm search system;

causing the algorithm search system to search for an output machine learning algorithm to perform a particular machine learning task using operations comprising:
- receiving the data specifying an input machine learning algorithm that performs the particular machine learning task;
- receiving data specifying a search algorithm that searches for candidate machine learning algorithms and an evaluation function that evaluates the performance of candidate machine learning algorithms;
- generating data representing a symbolic tree from the input machine learning algorithm, wherein the symbolic tree is a tree of a plurality of nodes, wherein each node represents a component in the input machine learning algorithm and is associated with a concrete value;
- generating data representing a hyper symbolic tree from the symbolic tree by changing each node in a subset of the plurality of the nodes in the symbolic tree to a respective new node having a respective placeholder value with a corresponding set of possible concrete values;
- searching an algorithm search space that defines a set of possible concrete symbolic trees from the hyper symbolic tree, wherein each node in a possible concrete symbolic tree corresponds to a respective node in the hyper symbolic tree and takes a particular concrete value from a corresponding set of possible concrete values associated with the respective node in the hyper symbolic tree, wherein each possible concrete symbolic tree corresponds to a candidate machine learning algorithm, and wherein searching the algorithm search space comprises performing the following operations at least once:
  - generating data representing a candidate concrete symbolic tree by using the search algorithm to search for the candidate concrete symbolic tree in the algorithm search space;
  - generating a candidate machine learning algorithm from the candidate concrete symbolic tree,
  - training the candidate machine learning algorithm on the particular machine learning task, and
  - determining, using the evaluation function, a performance metric specifying a performance of the trained candidate machine learning algorithm on the particular machine learning task; and
- selecting one or more trained candidate machine learning algorithms among the trained candidate machine learning algorithms based on the determined performance metrics; and
- using the output machine learning algorithm to perform the particular machine learning task.

* * * * *